(12) United States Patent
Kobayashi

(10) Patent No.: US 7,940,964 B2
(45) Date of Patent: May 10, 2011

(54) METHOD AND IMAGE PROCESSOR FOR PROCESSING IMAGE DATA TO ADJUST FOR BRIGHTNESS IN FACE, AND METHOD AND APPARATUS FOR PRINTING WITH ADJUSTED IMAGE DATA

(75) Inventor: Toshie Kobayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1140 days.

(21) Appl. No.: 11/657,702

(22) Filed: Jan. 23, 2007

(65) Prior Publication Data
US 2007/0183658 A1 Aug. 9, 2007

(30) Foreign Application Priority Data
Jan. 23, 2006 (JP) ................... P2006-013610

(51) Int. Cl.
G06K 9/00 (2006.01)
G06K 9/46 (2006.01)
G06K 9/40 (2006.01)
H04N 1/40 (2006.01)

(52) U.S. Cl. ........ 382/118; 382/103; 382/167; 382/190; 382/274; 358/461

(58) Field of Classification Search .......... 382/118, 382/103, 167, 190, 274; 358/461
See application file for complete search history.

(56) References Cited

U.S. PATENT DOCUMENTS
2004/0218832 A1* 11/2004 Luo et al. ............... 382/274
2004/0240747 A1* 12/2004 Jarman et al. .......... 382/274

FOREIGN PATENT DOCUMENTS
| JP | 10-175318 | 6/1998 |
|----|-----------|--------|
| JP | 2000-006445 | 1/2000 |
| JP | 2004-240829 | 8/2004 |
| JP | 2005-242535 | 9/2005 |
| JP | 2006-018739 | 1/2006 |

OTHER PUBLICATIONS

Abstract of Japanese Patent Publication No. 2005-242535, Pub. Date: Sep. 8, 2005, Patent Abstracts of Japan.
Abstract of Japanese Patent Publication No. 2006-018739, Pub. Date: Jan. 19, 2006, Patent Abstracts of Japan.
Abstract of Japanese Patent Publication No. 10-175318, Pub. Date: Jun. 30, 1998, Patent Abstracts of Japan.
Abstract of Japanese Patent Publication No. 2000-006445, Pub. Date: Jan. 11, 2000, Patent Abstracts of Japan.
Abstract of Japanese Patent Publication No. 2004-240829, Pub. Date: Aug. 26, 2004, Patent Abstracts of Japan.
Y. Leng et al., "Face Image Correction by Average Template," *Computer Applications*, vol. 25, No. 8 (Aug. 2005), pp. 1774-1776.

* cited by examiner

*Primary Examiner* — Kathleen S Yuan
(74) *Attorney, Agent, or Firm* — Martine Penilla & Gencarella, LLP

(57) ABSTRACT

Image data obtained by capturing an image including a human is received. The image data is analyzed and a part of the image including a human face is extracted. A prescribed part of the extracted human face is detected. Brightness of the image data is adjusted with reference to the prescribed part to obtain adjusted image data. An image is printed based on the adjusted image data.

8 Claims, 14 Drawing Sheets

FIG. 10

| | | | | | | | | | | | | | | | |
|---|---|---|---|---|---|---|---|---|---|---|---|---|---|---|---|
| 1 | 177 | 58 | 170 | 70 | 186 | 79 | 161 | 94 | 171 | 16 | 164 | 24 | 158 | 227 | 6 | 133 | 157 |
| 255 | 109 | 212 | 42 | 242 | 5 | 223 | 48 | 209 | 67 | 248 | 81 | 234 | 132 | 56 | 120 | 253 |
| 123 | 33 | 127 | 181 | 83 | 155 | 105 | 140 | 30 | 150 | 119 | 182 | 40 | 89 | 220 | 163 | 44 |
| 219 | 91 | 237 | 22 | 121 | 198 | 61 | 188 | 111 | 215 | 3 | 98 | 201 | 140 | 10 | 95 |
| 11 | 195 | 53 | 136 | 227 | 37 | 247 | 12 | 233 | 52 | 192 | 135 | 32 | 246 | 113 | 194 |
| 99 | 144 | 107 | 184 | 68 | 172 | 97 | 151 | 77 | 173 | 84 | 237 | 123 | 61 | 167 | 46 |
| 225 | 40 | 251 | 6 | 217 | 116 | 28 | 196 | 125 | 35 | 207 | 17 | 153 | 203 | 24 |
| 87 | 169 | 78 | 162 | 59 | 146 | 211 | 64 | 254 | 142 | 72 | 178 | 87 | 118 | 228 |
| 190 | 15 | 202 | 111 | 238 | 19 | 93 | 169 | 8 | 110 | 221 | 49 | 249 | 2 | 144 |
| 74 | 246 | 134 | 43 | 174 | 128 | 230 | 50 | 216 | 154 | 26 | 168 | 79 | 184 |
| 176 | 30 | 98 | 219 | 86 | 34 | 139 | 195 | 101 | 56 | 241 | 127 | 213 | 37 |
| 69 | 148 | 196 | 2 | 159 | 247 | 89 | 11 | 136 | 185 | 92 | 14 | 108 |
| 187 | 41 | 126 | 226 | 106 | 57 | 190 | 115 | 235 | 36 | 208 | 121 | 229 |
| 81 | 214 | 92 | 53 | 145 | 204 | 27 | 166 | 74 | 157 | 82 | 165 | 31 |
| 232 | 21 | 170 | 240 | 13 | 132 | 252 | 51 | 222 | 4 | 245 | 48 |
| 130 | 155 | 55 | 115 | 183 | 78 | 122 | 196 | 102 | 180 | 65 | 173 |
| 72 | 252 | 100 | 211 | 45 | 231 | 20 | 148 | 39 | 133 | 205 |
| 202 | 32 | 179 | 5 | 163 | 95 | 191 | 86 | 239 | 111 | 29 |
| 104 | 143 | 58 | 243 | 70 | 218 | 63 | 161 | 9 | 209 |
| 64 | 236 | 129 | 110 | 151 | 25 | 199 | 49 | 172 | 68 |
| 171 | 17 | 208 | 38 | 225 | 131 | 99 | 254 | 113 |
| 80 | 191 | 87 | 174 | 76 | 189 | 13 | 143 |
| 247 | 35 | 152 | 2 | 248 | 55 |
| 140 | 108 | 197 | 127 | 96 |
| 13 | 215 | 46 | 229 |
| 164 | 90 | 180 |
| 52 | 253 |
| 205 |

→ 64 PIXELS

↓ 64 PIXELS

METHOD AND IMAGE PROCESSOR FOR PROCESSING IMAGE DATA TO ADJUST FOR BRIGHTNESS IN FACE, AND METHOD AND APPARATUS FOR PRINTING WITH ADJUSTED IMAGE DATA

BACKGROUND

1. Technical Field

The present invention relates to a technology that prints or processes an image captured so as to include a human.

2. Related Art

Various printers including an ink jet printer have an advantage that a color image can be simply and conveniently printed without needing a large apparatus and thus they are widely used as an image output device. Further, in such printers, in order to enable simple and convenient printing with sufficient quality, there are developed various technologies such as increasing the number of ink color, increasing the number of printable dot size, improvement of image processing technique, and so on. Such technologies are disclosed in, for example, Japanese Patent Publication Nos. 10-175318A and 2000-6445A (JP-A-10-175318 and JP-A-2000-6445). As a result, at present, an image captured by a digital camera can be printed with high quality comparable to a color photograph printed with a silver salt film. Further, a subtle difference in impression due to a slight difference in how light enters can be expressed.

However, when an image including a human is captured and printed, the following problem, which was not observed in the preceding printer, occurs. That is, a human face may be printed to give a favorable impression, while a face that gives a planar flat impression may be printed. This problem does not occur until reproducibility of a printer has been improved nowadays. Accordingly, it can be considered that the above problem occurs since the reproducibility of the printer is improved so that a subtle difference in impression due to a slight difference in how light enters can be expressed.

SUMMARY

It is therefore one advantageous aspect of the invention to provide a technology that can always print a human face to give a favorable impression.

According to one aspect of the invention, there is provided a printing method, comprising:
receiving image data obtained by capturing an image including a human;
analyzing the image data and extracting a part of the image including a human face;
detecting a prescribed part of the extracted human face;
adjusting brightness of the image data with reference to the prescribed part to obtain adjusted image data; and
printing an image based on the adjusted image data.

In a case where an image including a human is printed, a face in the image sometimes gives a planar flat impression due to a slight difference in how light enters when the image is captured. However, by adjusting brightness of a prescribed part of the face, the face can be made stereoscopic so that it is possible to print an image including a face which always gives a favorable impression. Although the printed face is a face which has been subjected to the adjustment, the user does not recognize that the adjustment has been performed because this is a different case from a case where the adjustment is performed through the use of an exclusive application software. Thus, the user regards the printed image as a so-called good-looking photo and can feel satisfaction.

The prescribed part may include a nasalis muscle. The image data may be so adjusted that the brightness of the nasalis muscle is increased.

By increasing the brightness of the nasalis muscle, since it looks as if the nasalis muscle is highly prominent from the face. The face can be made stereoscopic. Thus, it is possible to cause the printed face to give a favorable and good-looking impression.

The prescribed part may include a nasalis muscle and at least one of nostrils. The image data may be so adjusted that the brightness of an area aside the nasalis muscle and above the at least one of nostrils is decreased.

By making a side part of the nasalis muscle above the nostril dark, it looks as if the nasalis muscle is highly prominent from the face as an effect. Thus, the face can be made stereoscopic. Of course, in addition to that, by adjusting the nasalis muscle so as to be bright, the face can give a stereoscopic impression that the face has a straight nose.

The prescribed part may include at least one of cheeks. The image data may be so adjusted that the brightness of the at least one of the cheeks is decreased.

By making the cheeks dark, since it looks as if the cheeks are recessed so as to make shady parts, the face giving a stereoscopic and firm impression. Thus, it is possible to cause the printed face to give a favorable and good-looking impression. Of course, in addition to that, the nasalis muscle may be made bright and the side part of the nasalis muscle may be made dark in order to print an image including a face giving a more stereoscopic and favorable impression.

The printing method may further comprise:
detecting whether the image data includes information indicative whether the image is captured with flashlight; and
printing the image data without the correction in a case where the information indicates that the image is captured without flashlight.

There are many cases where an image captured using flashlight includes a human and the human face gives a flat impression. Accordingly, when the judgment about whether to perform the face adjustment or not is made according to presence/absence of the flash, it can be simply and appropriately judged whether to perform the adjustment. Thus, face extraction and face adjustment will not be executed with respect to, for example, a landscape image including no human or an image in which a human is included but a face is small, which would otherwise be redundant.

According to one aspect of the invention, there is provided a printing apparatus, comprising:
a receiver, operable to receive image data obtained by capturing an image including a human;
an analyzer, operable to analyze the image data and to extract a part of the image including a human face;
a detector, operable to detect a prescribed part of the extracted human face;
an adjuster, operable to adjust brightness of the image data with reference to the prescribed part to obtain adjusted image data; and
a printing section, operable to print an image based on the adjusted image data.

According to one aspect of the invention, there is provided an image processing method, comprising:
receiving image data obtained by capturing an image including a human;
analyzing the image data and extracting a part of the image including a human face;
detecting a prescribed part of the extracted human face;

adjusting brightness of the image data with reference to the prescribed part to obtain adjusted image data; and generating control data adapted to be used in a printing apparatus, based on the adjusted image data.

By adjusting the brightness of the prescribed part of the face in this way, the face can be caused to be looked stereoscopic. Accordingly, by generating the control data based on the image data adjusted in this way, and by supplying the generated control data to the printing apparatus, it is possible to print an image including a face which always gives a good-looking and favorable impression, even when the original image includes a face giving a planar and flat impression.

According to one aspect of the invention, there is provided an image processor, comprising:

a receiver, operable to receive image data obtained by capturing an image including a human;

an analyzer, operable to analyze the image data and to extract a part of the image including a human face;

a detector, operable to detect a prescribed part of the extracted human face;

an adjuster, operable to adjust brightness of the image data with reference to the prescribed part to obtain adjusted image data; and a generator, operable to generate control data adapted to be used in a printing apparatus, based on the adjusted image data.

BRIEF DESCRIPTION OF THE DRAWINGS

FIG. 10 is a diagram showing a part of a dither matrix used in a halftoning in the image copy processing.

DETAILED DESCRIPTION OF EXEMPLARY EMBODIMENTS

Exemplary embodiments of the invention will be described below in detail with reference to the accompanying drawings.

Figure 1:
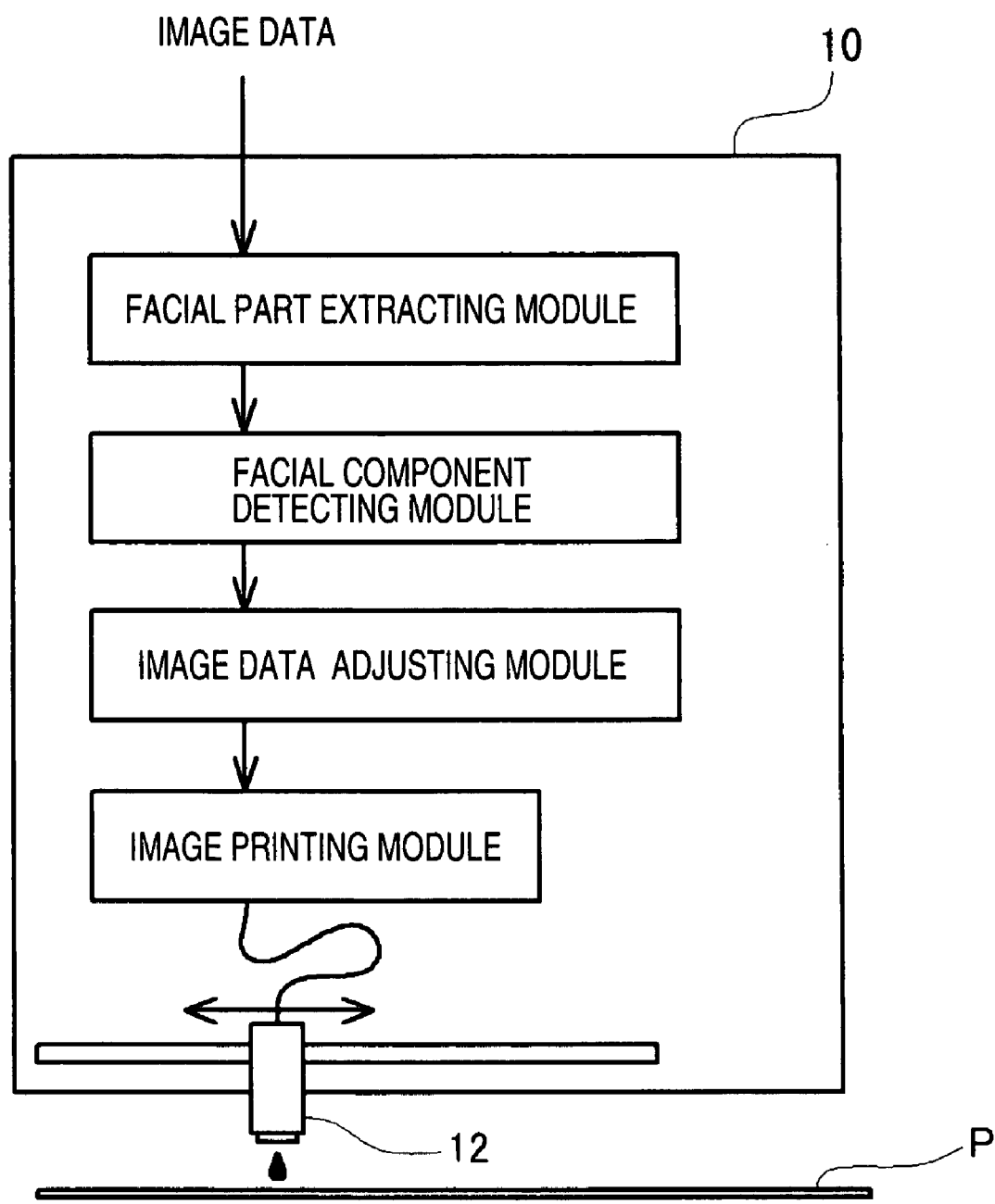
FIG. 1 is a schematic view showing a printing apparatus according to one embodiment of the invention.

A printing apparatus 10 shown in FIG. 1 is provided with a printing head 12 operable to eject ink droplets. The printing apparatus 10 is a so-called ink jet printer in which, while the printing head 12 reciprocates above a printing medium P, ink droplets are ejected so as to form ink dots on the printing medium P, thereby printing an image.

In such an ink jet printer, printing quality is improved every year, and a slight difference in impression due to a slight difference in how light enters can be expressed today. Meanwhile, a human face may be printed to give a favorable impression, while a face that gives a planar flat impression may be printed. In view of this problem, in the printing apparatus according to this embodiment shown in FIG. 1, individual modules, such as a facial part extracting module, a facial component detecting module, an image data adjusting module and the like are incorporated. Moreover, the term "module" refers to a functional feature corresponding to a series of processing to be performed internally when the printing apparatus 10 prints an image. Accordingly, the "module" may be implemented using a part of a program, a logical circuit having a specific function, or a combination thereof.

In the printing apparatus 10 shown in FIG. 1, when image data of an image to be printed is received, the following image processing is performed by the individual modules, then the printing head 12 is driven, and subsequently the image is printed on the printing medium P. First, the facial part extracting module analyzes the received image data to extract a portion corresponding to the human face. Next, the facial component detecting module detects a prescribed part (for example, a nasalis muscle or a cheek) of the extracted face and corrects brightness of image data for the detected portion. The image data adjusted in such a manner is supplied to an image printing module and is converted into a signal for driving the printing head 12. Then, an image is printed on the printing medium P. If the image is printed in such a manner, even though an image including a human is printed, there is no case where the human face gives a planar flat impression according to how light enters. Therefore, an image an image can be printed to always give a favorable impression. Hereinafter, the printing apparatus 10 will be described in detail by way of the embodiment.

Figure 2:
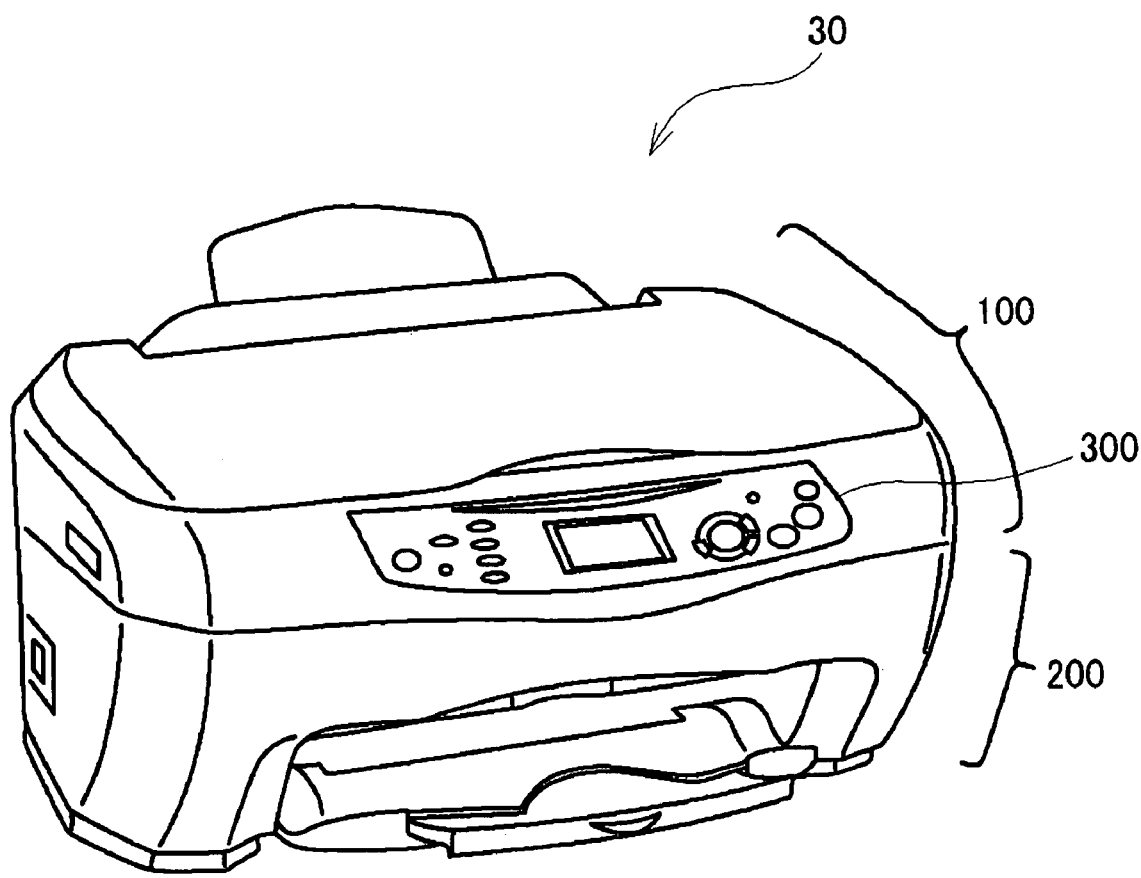
FIG. 2 is a perspective view showing an external appearance of the printing apparatus.

As shown in FIG. 2, the printing apparatus 10 of this embodiment includes a scanner section 100, a printer section 200, and a control panel 300 that controls operations of the scanner section 100 and the printer section 200. The scanner section 100 has a scanner function of reading a printed image and generating image data. The printer section 200 has a printer function of receiving the image data and printing an image on a printing medium. Further, if an image (original image) read by the scanner section 100 is output from the printer section 200, a copier function can be realized. That is, the printing apparatus 10 of this embodiment is a so-called scanner/printer/copier hybrid apparatus (hereinafter, referred to as SPC hybrid apparatus) that can solely realize the scanner function, the printer function, and the copier function.

Figure 3:
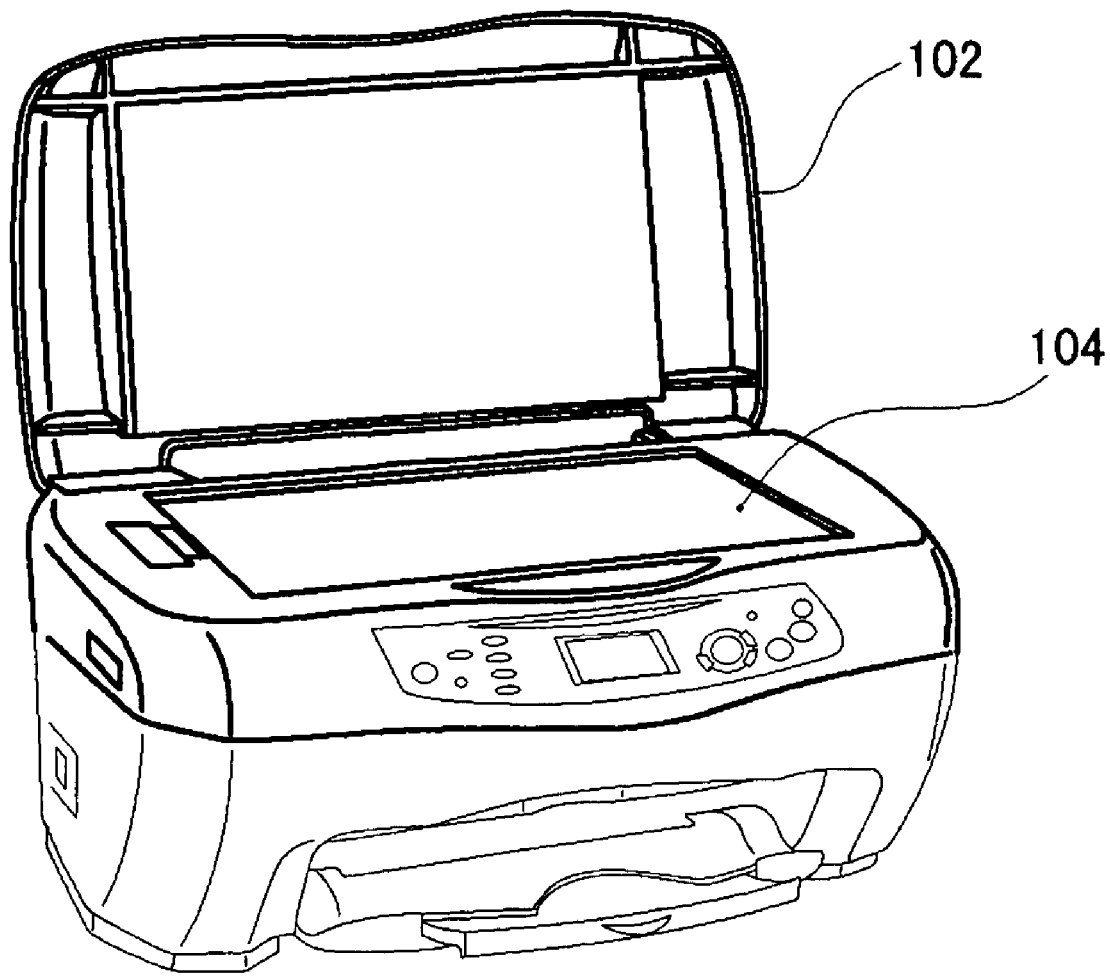
FIG. 3 is a perspective view showing a state that a table cover of the printing apparatus is opened.

As shown in FIG. 3, when a table cover 102 is opened upward, a transparent original table 104 is provided, and various mechanisms, which will be described below, for implementing the scanner function are mounted therein. When an original image is read, the table cover 102 is opened, and the original image is placed on the original table 104. Next, the table cover 102 is closed, and a button on the control panel 300 is operated. Then, the original image can be directly converted into image data.

Further, the entire scanner section 100 is housed in a case as a single body, and the scanner section 100 and the printer section 200 are coupled to each other by a hinge mechanism 204 (see FIG. 4) on a rear side of the printing apparatus 10.

For this reason, only the scanner section 100 can rotate around the hinge when a front side of the scanner section 100 is lifted.

Figure 4:
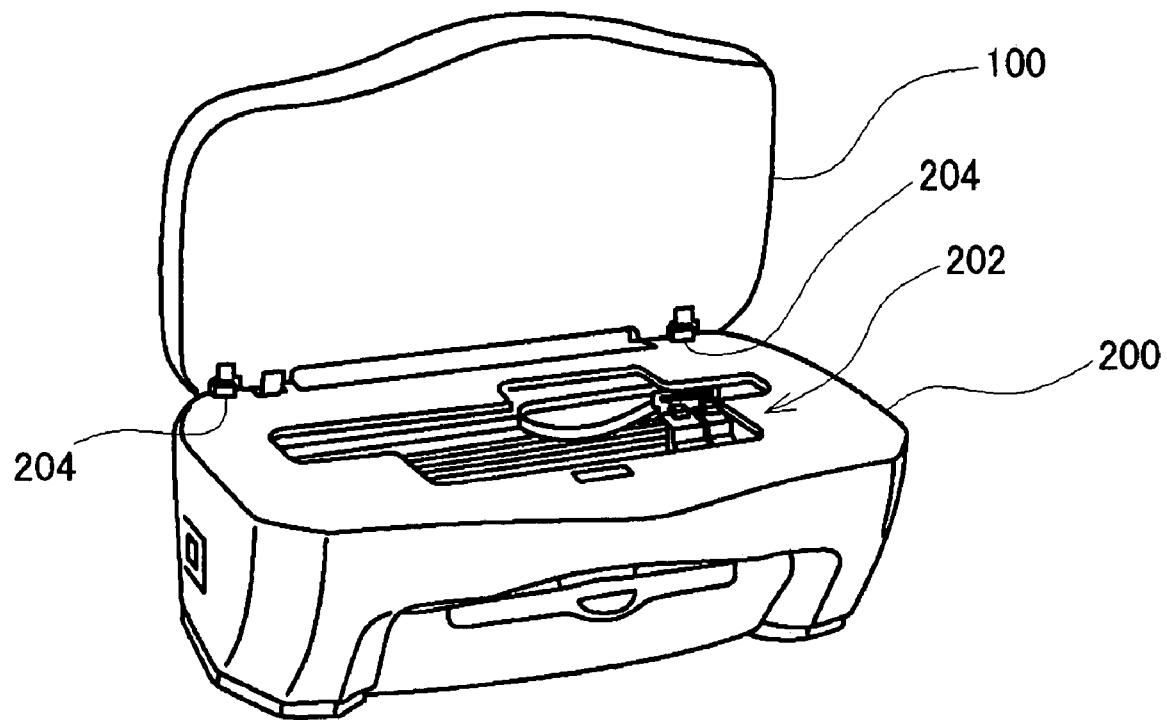
FIG. 4 is a perspective view showing a state that a scanner section of the printing apparatus is lifted up.

As shown in FIG. 4, in the printing apparatus 10 of this embodiment, when the front side of the scanner section 100 is lifted, the top face of the printer section 200 can be exposed. In the printer section 200, various mechanisms, which will be described below, for implementing the printer function, are provided. Further, in the printer section 200, a control circuit 260, which will be described below, for controlling the overall operation of the printing apparatus 10 including the scanner section 100, and a power supply circuit (not shown) for supplying power to the scanner section 100 or the printer section 200 are provided. In addition, as shown in FIG. 4, an opening portion 202 is provided on the upper face of the printer section 200, through which replacement of consumables such as ink cartridges, treatment of paper jam, and easy repair can be simply executed.

Figure 5:
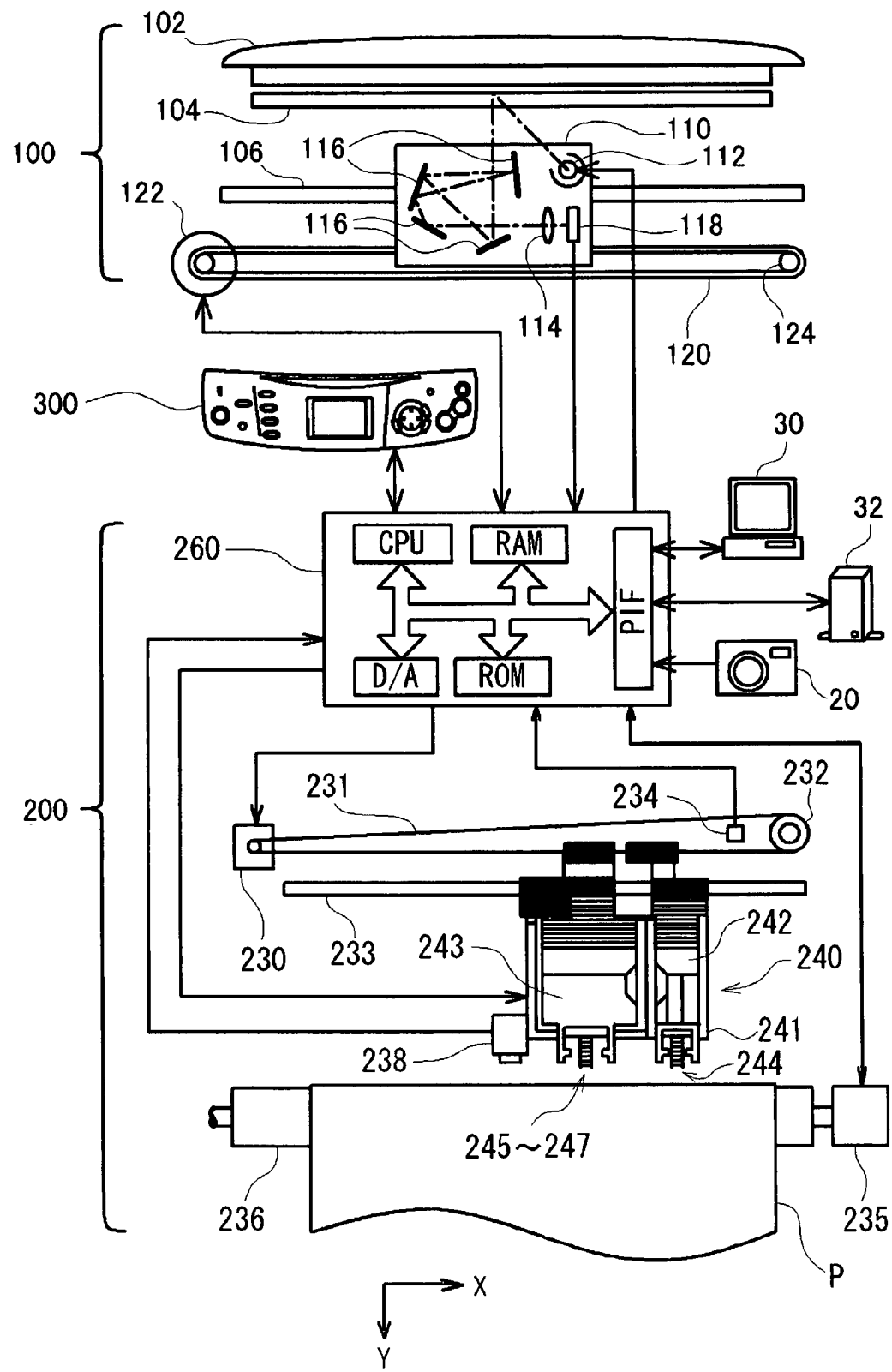
FIG. 5 is a schematic view showing an internal configuration of the printing apparatus.

Next, a description is given of the internal constructions of the scanner section 100 and the printer section 200 with reference to FIG. 5.

The scanner section 100 includes: the transparent original table 104 on which a printed original color image is set; a table cover 102 which presses a set original color image; a scanner carriage 110 for reading an original color image; a carriage belt 120 to move the scanner carriage 110 in the primary scanning direction X; a drive motor 122 to supply power to the carriage belt 120; and a guide shaft 106 to guide movements of the scanner carriage 110. In addition, operations of the drive motor 122 and the scanner carriage 110 are controlled by the control circuit 260 described later.

The scanner section 100 includes a transparent original table 104, on which a original image is set, a table cover 102 that presses the set original image, a reading carriage 110 that reads the set original image, a driving belt 120 that moves the reading carriage 110 in a reading direction (main scanning direction), a driving motor 122 that supplies power to the driving belt 120, and a guide shaft 106 that guides the movement of the reading carriage 110. Further, the operation of the driving motor 122 or the reading carriage 110 is controlled by a control circuit 260 described below.

As the drive motor 122 is rotated under control of the control circuit 260, the motion thereof is transmitted to the scanner carriage 110 via the carriage belt 120. As a result, the scanner carriage 110 is moved in the primary scanning direction X in response to the turning angle of the drive motor 122 while being guided by the guide shaft 106. Also, the carriage belt 120 is adjusted in a state that proper tension is always given thereto by an idler pulley 124. Therefore, it becomes possible to move the scanner carriage 110 in the reverse direction by the distance responsive to the turning angle if the drive motor 122 is reversely rotated.

A light source 112, a lens 114, mirrors 116, and a CCD sensor 118 are incorporated in the interior of the scanner carriage 110. Light from the light source 112 is irradiated onto the original table 104 and is reflected from an original color image set on the original table 104. The reflected light is guided to the lens 114 by the mirror 116, is condensed by the lens 114 and is detected by the CCD sensor 118. The CCD 118 is composed of a linear sensor in which photo diodes for converting the light intensity to electric signals are arrayed in the direction orthogonal to the primary scanning direction X of the scanner carriage 110. For this reason, while moving the scanner carriage 110 in the primary scanning direction X, light of the light source 112 is irradiated onto an original color image, and the intensity of the reflected light is detected by the CCD sensor 118, whereby it is possible to obtain electric signals corresponding to the original color image.

Further, the light source 112 is composed of light emitting diodes of three colors of RGB, which is able to irradiate light of R color, G color and B color at a predetermined cycle by turns. In response thereto, reflected light of R color, G color and B color can be detected by the CCD sensor 118 by turns. Generally, although red portions of the image reflect light of R color, light of G color and B color is hardly reflected. Therefore, the reflected light of R color expresses the R component of the image. Similarly, the reflected light of G color expresses the G component of the image, and the reflected light of B color expresses the B component of the image. Accordingly, light of three colors of RGB is irradiated onto an original color image while being changed at a predetermined cycle. If the intensities of the reflected light are detected by the CCD sensor 118 in synchronization therewith, it is possible to detect the R component, G component, and B component of the original color image, wherein the color image can be read. In addition, since the scanner carriage 110 is moving while the light source 112 is changing the colors of light to be irradiated, strictly speaking, the position of an image for which the respective components of RGB are detected will differ corresponding to the amount of movement of the scanner carriage 110. However, the difference can be corrected by an image processing after the respective components are read.

The printer section 200 is provided with the control circuit 260 for controlling the operations of the entirety of the printing apparatus 10, a printer carriage 240 for printing images on a printing medium P, a mechanism for moving the printer carriage 240 in the primary scanning direction X, and a mechanism for feeding the printing medium P.

The printer carriage 240 is composed of an ink cartridge 242 for accommodating K ink, an ink cartridge 243 for accommodating various types of ink of C ink, M ink, and Y ink, and a head unit 241 secured on the bottom face. The head unit 241 is provided with an head for ejecting ink drops per ink. If the ink cartridges 242 and 243 are mounted in the printer carriage 240, respective ink in the cartridges are supplied to the printing heads 244 through 247 of respective ink through a conduit (not illustrated).

The mechanism for moving the printer carriage 240 in the primary scanning direction X is composed of a carriage belt 231 for driving the printer carriage 240, a carriage motor 230 for supplying power to the carriage belt 231, a tension pulley 232 for applying proper tension to the carriage belt 231 at all times, a carriage guide 233 for guiding movements of the printer carriage 240, and a reference position sensor 234 for detecting the reference position of the printer carriage 240. If the carriage motor 230 is rotated under control of a control circuit 260 described later, the printer carriage 240 can be moved in the primary scanning direction X by the distance responsive to the turning angle. Further, if the carriage motor 230 is reversed, it is possible to cause the printer carriage 240 to move in the reverse direction.

The mechanism for feeding a printing medium P is composed of a platen 236 for supporting the printing medium P from the backside and a medium feeding motor 235 for feeding paper by rotating the platen 236. If the medium feeding motor 235 is rotated under control of a control circuit 260 described later, it is possible to feed the printing medium P in a secondary scanning direction Y by the distance responsive to the turning angle.

The control circuit 260 is composed of a ROM, a RAM, a D/A converter for converting digital data to analog signals, and further an interface PIF for peripheral devices for communications of data between the CPU and the peripheral devices, including the CPU. The control circuit 260 controls operations of the entirety of the printing apparatus 10 and controls these operations through communications of data between the light source 112, the drive motor 122 and the CCD 118, which are incorporated in the scanner section 100.

In addition, the control circuit 260 controls supplying drive signals to the printing heads 244 through 247 of respective colors and ejecting ink drops while causing the printer carriage 240 to be subjected to primary scanning and secondary scanning by driving the carriage motor 230 and the medium feeding motor 235. The drive signals supplied to the printing heads 244 through 247 are generated by reading image data from a computer 20 and a digital camera 30, and executing an image processing described later. As a matter of course, by applying an image processing to the RGB image data read by the scanner section 100, it is possible to generate the drive signals. Thus, under the control of the control circuit 260, ink dots of respective colors are formed on a printing medium P by ejecting ink drops from the printing heads 244 through 247 while causing the printer carriage 240 to be subjected to the primary scanning and secondary scanning, whereby it becomes possible to print a color image. As a matter of course, instead of executing an image processing in the control circuit 260, it is possible to drive the printing heads 244 through 247 by receiving image-processed data from the computer 20 while causing the printer carriage 240 to be subjected to the primary scanning and secondary scanning in compliance with the data.

Also, the control circuit 260 is connected so as to receive data from and transmit the same to the control panel 300, wherein by operating respective types of buttons secured on the control panel 300, it is possible to set detailed operation modes of the scanner function and the printer function. Furthermore, it is also possible to set detailed operation modes from the computer via the interface PIF for peripheral devices.

Figure 6:
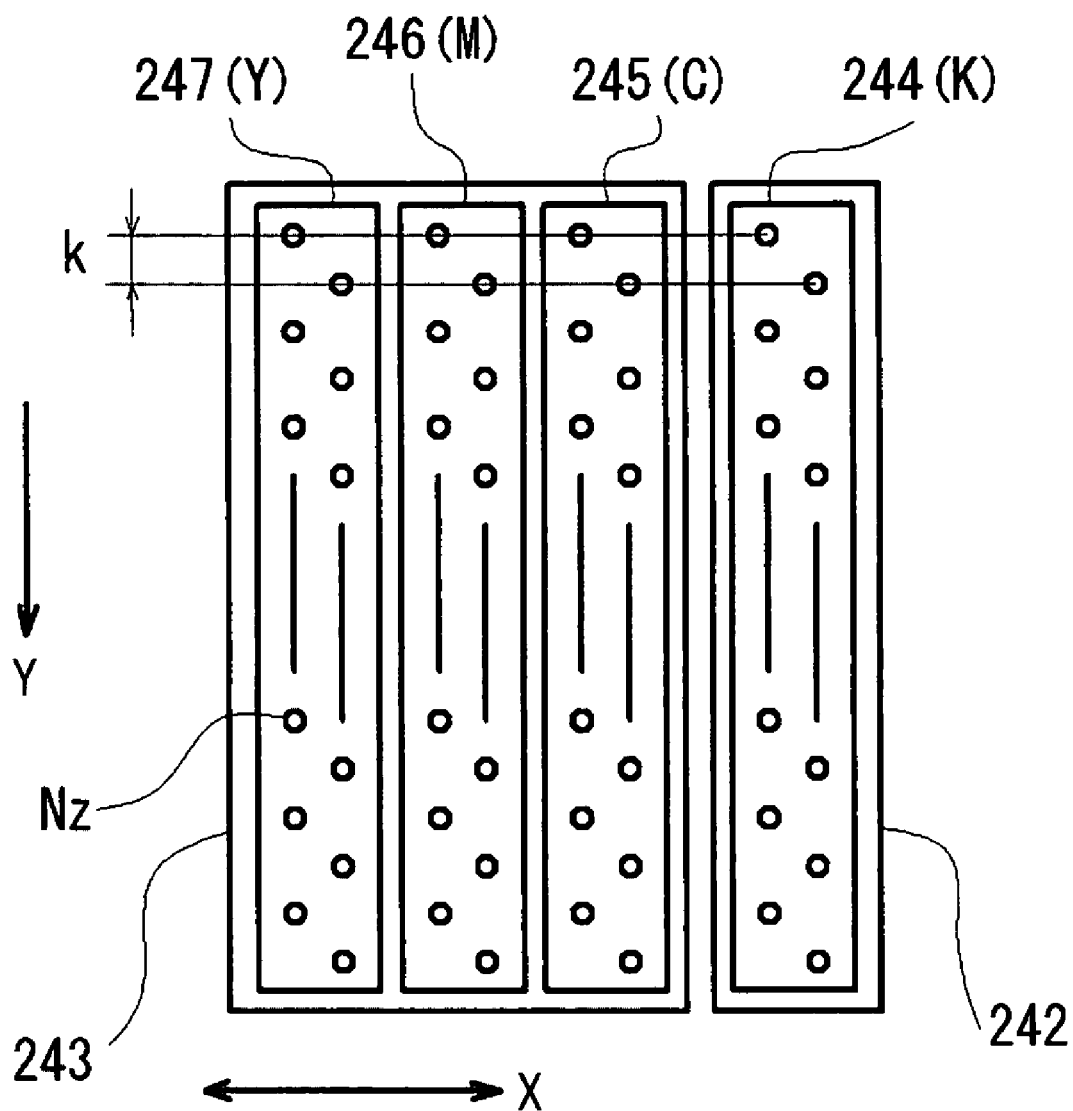
FIG. 6 is a schematic view showing nozzles of printing heads in a printer section of the printing apparatus.

As shown in FIG. 6, a plurality of nozzles Nz for ejecting ink drops are formed on the printing heads 244 through 247 of respective colors. As shown, four sets of nozzle arrays which eject ink drops of respective colors are formed on the bottom face of the printing heads of respective colors. In one set of the nozzle arrays, 48 nozzles Nz are arrayed in a zigzag manner with a pitch k. Drive signals are supplied from the control circuit 260 to the respective nozzles Nz, and the respective nozzles Nz eject drops of respective ink in compliance with the drive signals.

As described above, the printer section 200 of the printing apparatus 10 supplies the driving signals to cause the nozzles to eject ink droplets to form ink dots on the printing medium P, thereby printing an image. Further, control data for driving the nozzles is generated by performing a prescribed image processing on the image data prior to printing of the image. Hereinafter, a description will be given for processing that generates control data by performing an image processing on image data and processing that forms ink dots on the basis of the obtained control data, thereby printing the image (image print processing).

Figure 7:
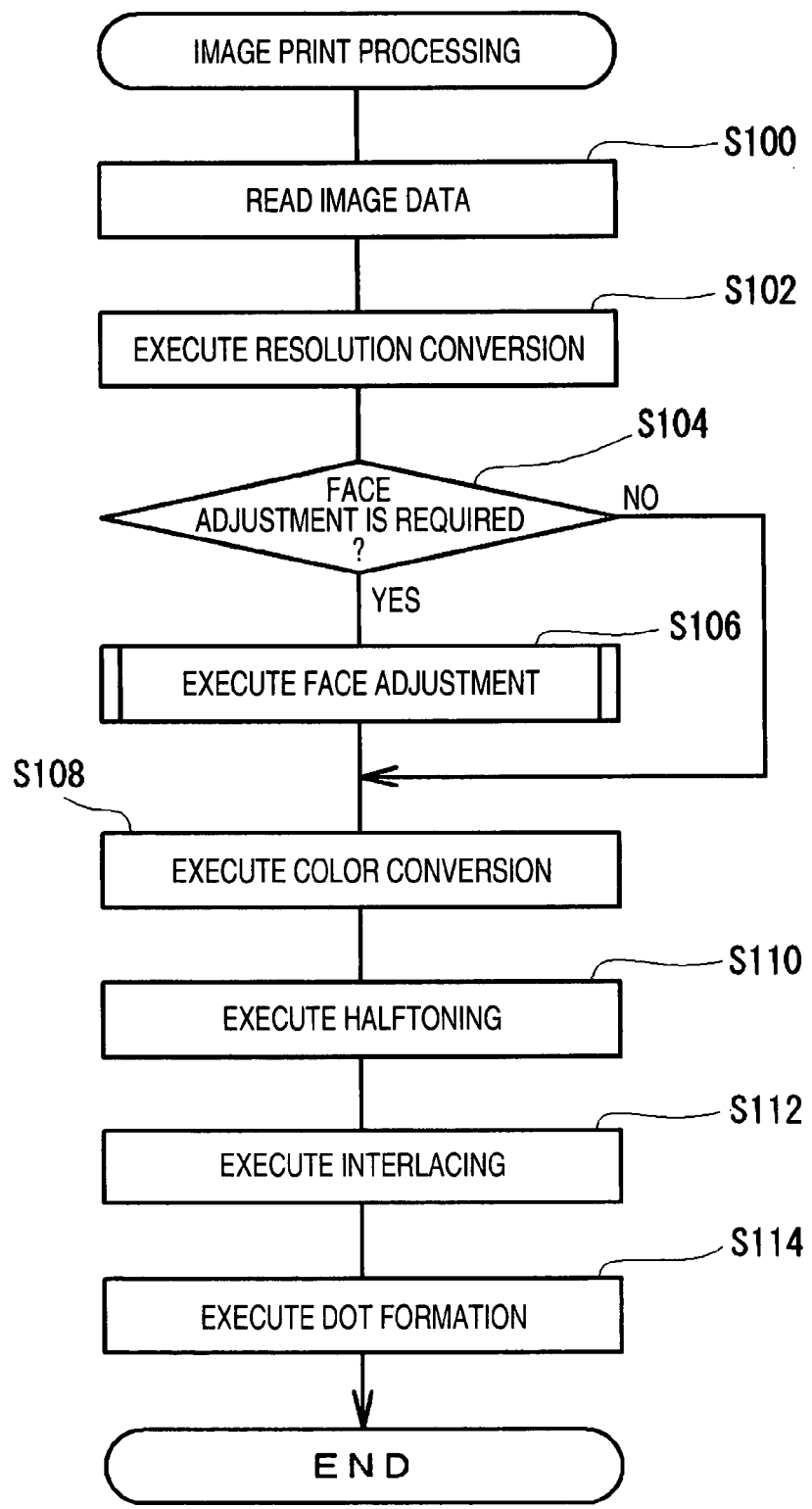
FIG. 7 is a flowchart showing an image print processing executed in the printing apparatus.

FIG. 7 shows the image print processing that is performed by the printing apparatus 10 in order to print an image. This processing is performed by the control circuit 260 mounted on the printing apparatus 10 using the internal CPU, RAM, or ROM. Hereinafter, the description will be given on the basis of the flowchart.

Before starting the image print processing, the control circuit 260 reads out image data to be printed (Step S100).

Here, it is assumed that the image data is RGB image data represented by grayscale valves of the individual colors R, G, and B.

Thereafter, a processing of converting a resolution of the read image data into a resolution to be printed by the printer section 200 (printing resolution) is performed (Step S102). When the resolution of the read image data is lower than the printing resolution, an interpolation operation is performed between adjacent pixels and new image data is set, such that the resolution of the read image data is converted into a higher resolution. In contrast, when the resolution of the read image data is higher than the printing resolution, image data is thinned out from adjacent pixels at a prescribed ratio, such that the resolution of the read image data is converted into a lower resolution. In the resolution conversion processing, the processing of converting the read resolution into the printing resolution by generating or thinning out image data from the read image data at an appropriate ratio is performed.

After the resolution of the image data is converted into the printing resolution in such a manner, the control circuit 260 judges whether to perform a face adjustment on the image data or not (Step S104). Here, the face adjustment is a processing that detects a portion of the human face in the image data and adjusts the image such that the human face can give a favorable impression. Various methods can be used to judge whether to perform the face adjustment or not. As the simplest method, whether to perform the face adjustment or not may be prescribed by a user from the control panel 300 of the printing apparatus 10, and the judgment may be made on the basis of the prescribed content. Alternatively, through the analysis of the image data, it may be automatically judged whether to perform the face adjustment or not. For example, it may be judged whether or not an image is captured using flashlight and, when the flashlight is used, the face adjustment may be performed. As the standard of the image data, there is a standard having a header section in which various kinds of information about the image data are described. For such image data, through the analysis of the header section, it may be judged whether or not the image is captured using flashlight. Further, there are many cases where an image captured using flashlight includes a human and the human face gives a flat impression. Accordingly, when the judgment about whether to perform the face adjustment or not is made according to presence/absence of the flash, it can be simply and appropriately judged whether to perform the adjustment.

Figure 8:
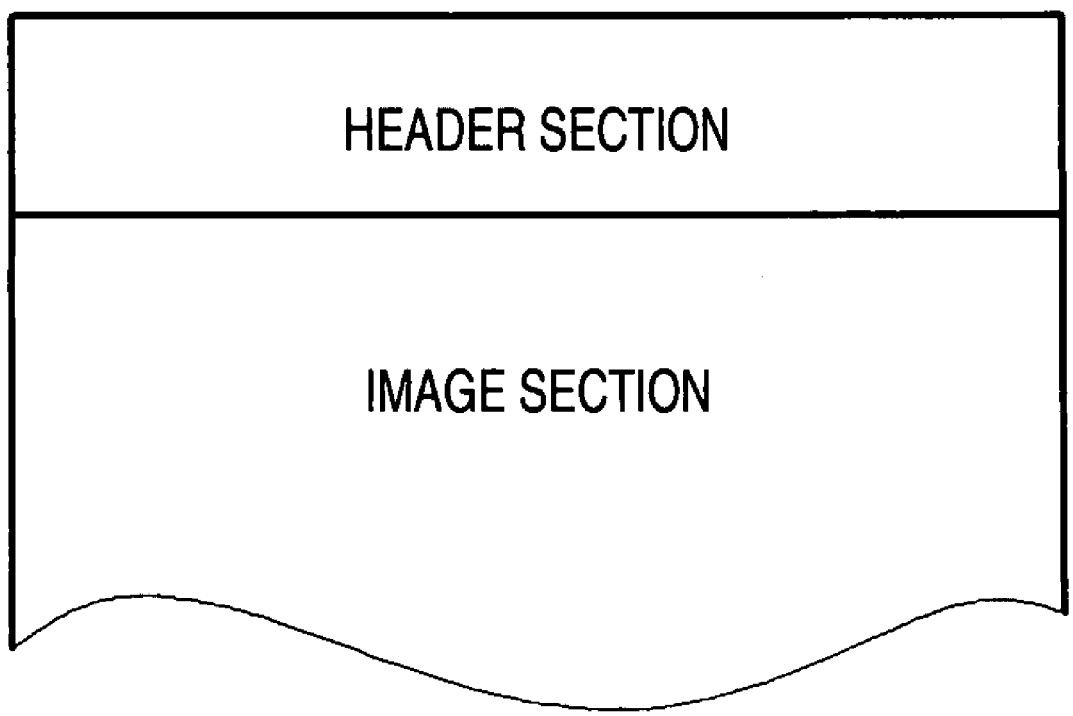
FIG. 8 is a schematic view showing data structure of image data having a header section.

As shown in FIG. 8, the printing apparatus 10 of this embodiment is configured to read image data having a header section and an image section. In the header section, sets of a tag and data representing various kinds of information determined according to the standard are set. Among the tags, a tag about whether or not the flashlight is used is included. Accordingly, when the tag indicating whether or not the flashlight is used is retrieved from the header section of the image data, and data subsequent to the tag is read out, it can be found whether or not the image data is captured using the flash.

In such a manner, it is judged whether to perform the face adjustment or not. At this time, when it is judged to perform the face adjustment (Step S104: Yes), the portion of the human face in the image is detected and a processing of correcting brightness of the facial portion to performing an adjustment such that a face gives a favorable impression is performed (Step S106). The details of the face adjustment processing will be described below. Meanwhile, when it is judged not to perform the face adjustment (Step S104: No), the face adjustment processing is skipped.

Thereafter, the control circuit 260 of the printing apparatus 10 performs a color conversion processing on the image data (Step S108). Here, the color conversion processing is a processing of converting the image data represented by the individual colors R, G, and B into image data represented by grayscale values of individual colors C, M, Y, and K. The color conversion processing is performed with reference to a three-dimensional numeric table that is called a color conversion table (LUT).

Figure 9:
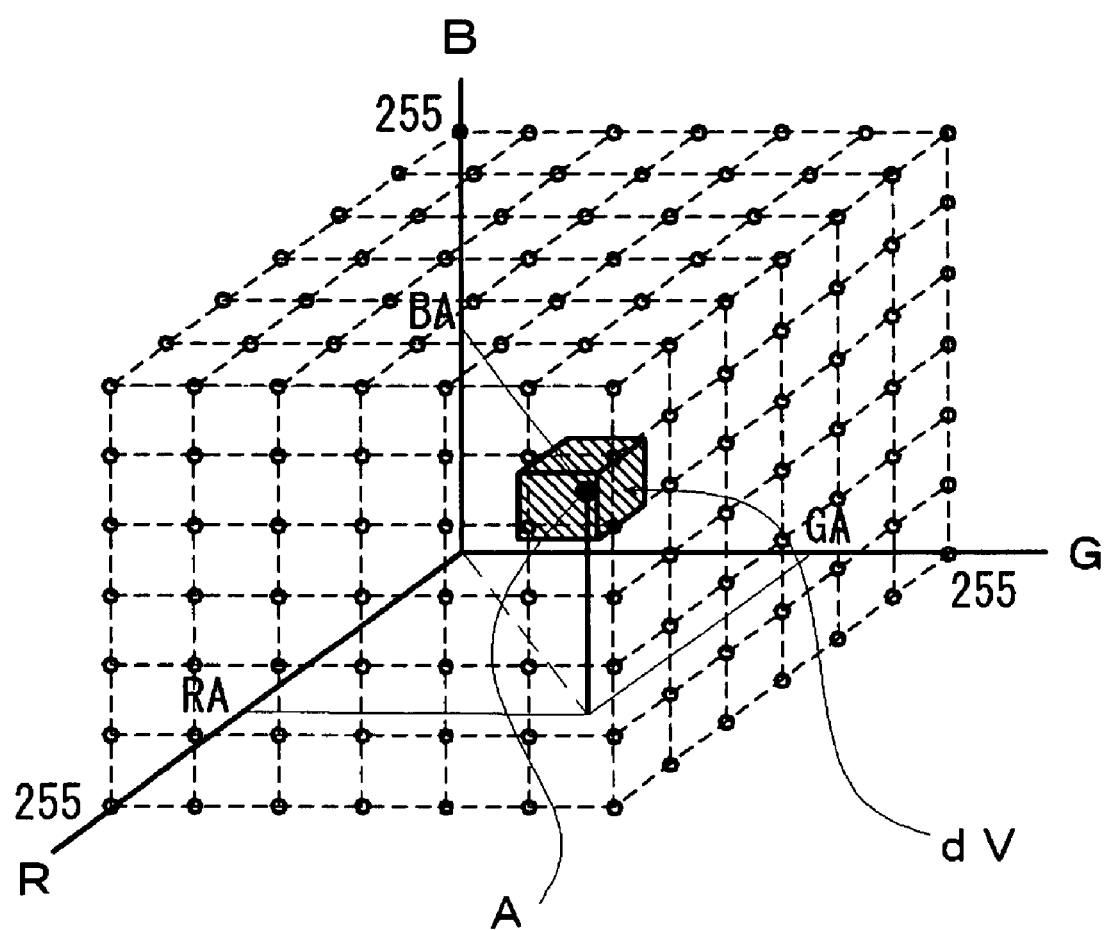
FIG. 9 is a diagram for explaining a color conversion table used in a color conversion processing in the image copy processing.

FIG. 9 shows a look-up table (LUT) to be referred to for the color conversion processing. Now, an RGB color space is taken into account, in which grayscale values of respective colors of R, G and B are taken in three axes orthogonal to each other as shown in FIG. 9, and it is assumed that the grayscale values of respective colors of RGB take values from 0 through 255. If so, all the RGB image data can be associated with an internal point of a cube (color solid), the original point of which is the top and the length of one side of which is 255. Therefore, changing the view point, if a plurality of lattice points are generated in the RGB color space by fragmenting the color solid in the form of a lattice orthogonal to the respective axes of RGB, it is considered that respective lattice points correspond to the RGB image data respectively. Therefore, combinations of grayscale values corresponding to the use amounts of ink of respective colors of C, M, Y and K are stored in advance in the respective lattice points. Thereby, the RGB image data can be quickly converted to image data corresponding to the use amounts of respective colors of ink (CMYK image data) by reading the grayscale values stored in the lattice points.

For example, if it is assumed that the R component of the image data is RA, the G component thereof is GA and the B component thereof is BA, the image data are associated with the point A in the RGB color space (refer to FIG. 10). Therefore, a cube dV having the point A included therein is detected from minute cubes which is fragmented from the color solid, the grayscale values of respective colors of ink, which are stored in the respective lattice points of the cube dV, are read. And, it is possible to obtain the grayscale value of the point A by executing an interpolation calculation based on the grayscale values the respective lattice points. As described above, it can be considered that the look-up table (LUT) is a three-dimensional numerical table in which combinations of grayscale values corresponding to the use amounts of ink of respective colors of C, M, Y and K are stored in a plurality of lattice points established in the RGB color space. And, by referencing the look-up table, it is possible to quickly convert the RGB image data in terms of color.

After the color conversion processing is terminated as described above, a halftoning is executed in the image copy processing shown in FIG. 7 (Step S100). The gradation data corresponding to the use amounts of ink of respective colors of CMYK obtained by the color conversion processing are data which can take a value from the grayscale value 0 through the grayscale value 255 per pixel. To the contrary, in the printer section 200, the printer section takes only a status on whether or not a dot is formed, with attention directed to individual pixels since the printer section 200 prints an image by forming dots. Therefore, it is necessary to convert the CMYK gradation data having 256 gradations to data (dot data) showing whether or not a dot is formed per pixel. The halftoning is a processing for converting the CMYK gradation data to dot data.

As a method for executing the halftoning, various types of methods such as an error diffusion method and a dither method may be employed. The error diffusion method diffuses the error in gradation expression generated in a certain pixel, by judging whether or not dots are formed in regard to the pixel, to the peripheral pixels, and at the same time, judges whether or not dots are formed in regard to respective pixels, so that the error diffused from the periphery can be dissolved. Also, the dither method compares the threshold values set at random in a dither matrix with the CMYK gradation data per pixel, and, for pixels in which the CMYK gradation data are greater, judges that dots are formed, and for pixels in which the threshold value is greater, judges that no dot is formed, thereby obtaining dot data for the respective pixels. As the halftoning, either the error diffusion method or the dither method can be used. In the printing apparatus 10 of this embodiment, it is assumed that the halftone processing is performed using the dither method.

FIG. 10 shows a part of the dither matrix. In the illustrated matrix, threshold values universally selected from the range of the grayscale values 0 through 255 are stored at random in 4096 pixels consisting of 64 pixels disposed in both the vertical and horizontal directions. Herein, the reason why the grayscale values of the threshold values are selected in the range of 0 through 255 corresponds to that the CMYK image data is of 1 byte in the embodiment, and the grayscale value takes a value from 0 through 255. In addition, the size of the dither matrix is not limited to 64 pixels in both the vertical and horizontal directions as shown in FIG. 10, but may be set to various sizes including a case in which the number of pixels differs in the vertical and horizontal directions.

Figure 11:
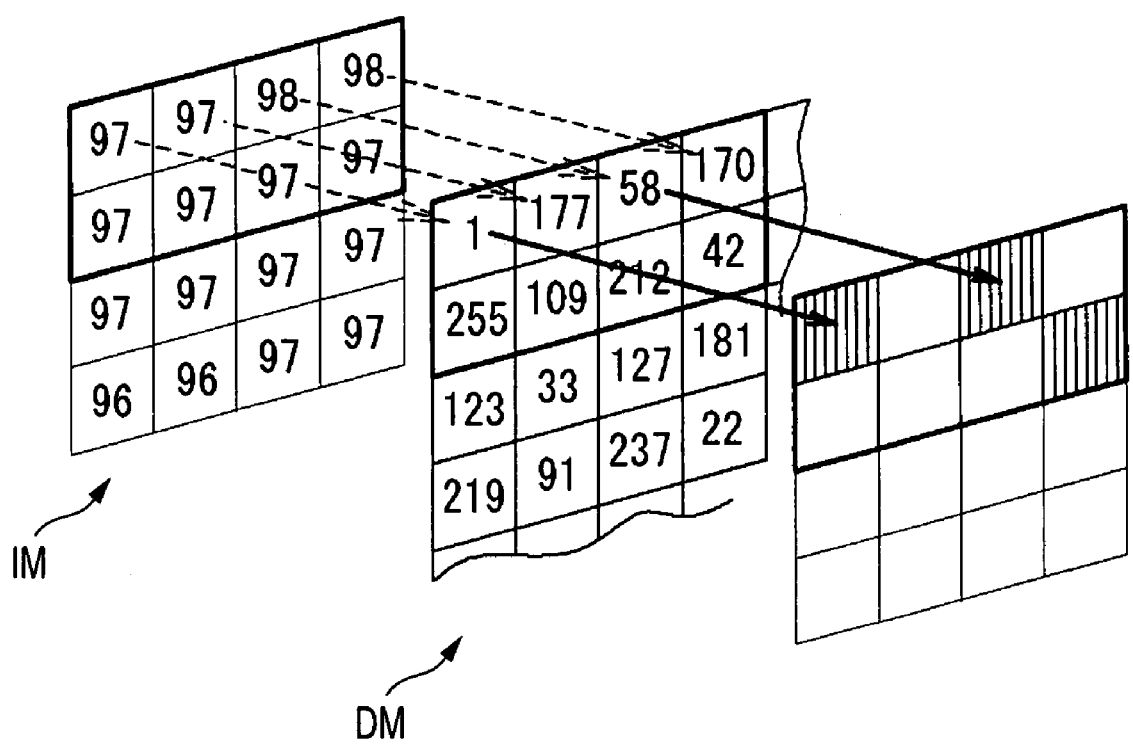
FIG. 11 is a diagram showing how to judge whether dots are formed for each pixel with reference to the dither matrix.

FIG. 11 shows how to judge whether or not dots are formed per pixel with reference to the dither matrix. Such judgment is made for respective colors of CMYK. However, hereinafter, to avoid complicated description, the CMYK image data are handled merely as image data without distinguishing respective colors of the CMYK image data.

When judging whether or not dots are formed, first, the grayscale value of the image data IM for a pixel to which attention is focused as an object to be judged (pixel of interest) is compared with the threshold value stored in the corresponding position in the dither matrix DM. The arrow of a dashed line, which is shown in the drawing, schematically expresses that the image data of the noted pixel are compared with the threshold value stored in the corresponding position in the dither matrix. Where the image data of the noted image is greater than the threshold value of the dither matrix, it is judged that a dot is formed for the pixel. To the contrary, where the threshold value of the dither matrix is greater than the other, it is judged that no dot is formed for the pixel. In the example shown in FIG. 11, the image data of the pixel located at the left upper corner of the image is "97", and the threshold value stored in the position corresponding to the pixel in the dither matrix is "1". Therefore, since, on the pixel located at the left upper corner, the image data are greater than the threshold value of the dither matrix, it is judged that a dot is formed for the pixel. The arrow of a solid line shown in the FIG. 11 schematically expresses the state that the result of judgment is written in a memory upon judging that a dot is formed.

On the other hand, in regard to a pixel adjacent to this pixel at the right side, the image data are "97", and the threshold value of the dither matrix is "177", wherein the threshold value is greater than the other. Therefore, it is judged that no dot is formed. Thus, by comparing the image data with the threshold value set in the dither matrix, it is possible to determine, at respective pixels, whether or not dots are formed. In the halftoning (Step S110 in FIG. 7), the above-described dither method is applied to the gradation data corresponding to the use amounts of respective ink of C, M, Y and K, whereby the processing of generating dot data is executed while judging, for each of the pixels, whether or not dots are formed.

After the gradation data of the respective colors of CMYK are converted to dot data, an interlacing is executed (Step S112). The interlacing re-arranges the dot data in the order along which the head unit 241 forms dots, and supplies the data to the printing heads 244 through 247 of the respective colors. That is, as shown in FIG. 6, since the nozzles Nz secured at the printing heads 244 through 247 are provided in the secondary scanning direction Y with the interval of nozzle pitch k spaced from each other, if ink drops are ejected while causing the printer carriage 240 to be subjected to primary scanning, dots are formed with the interval of nozzle pitch k spaced from each other in the secondary scanning direction Y. Therefore, in order to form dots in all the pixels, it is necessary that the relative position between the head 240 and a printing medium P is moved in the secondary scanning direction Y, and new dots are formed at pixels between the dots spaced only by the nozzle pitch k. As has been made clear from this, when actually printing an image, dots are not formed in the order from the pixels located upward on the image. Further, in regard to the pixels located in the same row in the primary scanning direction X, dots are not formed by one time of primary scanning, but dots are formed through a plurality of times of primary scanning based on the demand of the image quality, wherein it is widely executed that dots are formed at pixels in skipped positions in respective times of primary scanning.

Thus, in a case of actually printing an image, since it does not mean that dots are formed in the order of arrangement of pixels on the image, before actually commencing formation of dots, it becomes necessary that the dot data obtained for each of the colors of C, M, Y and K are re-arranged in the order along which the printing heads 244 through 247 form the same. Such a processing is called an "interlacing."

In the image copy processing, after the interlacing is completed, a processing of actually forming dots on a printing medium P (dot formation) is executed by the control circuit 260 based on the data obtained by the interlacing (Step S114). That is, while causing the printer carriage 240 to be subjected to primary scanning by driving the carriage motor 230, the dot data (printing control data) whose order has been re-arranged are supplied to the printing heads 244 through 247. As a result, the ink droplets are ejected from the ink ejection heads 244 through 247 according to the dot data, and the dots are appropriately formed at each pixel.

After one time of primary scanning is completed, the printing medium P is fed in the secondary scanning direction Y by driving the medium feeding motor 235. After that, again, the dot data (printing control data) whose order has been re-arranged are supplied to the printing heads 244 through 247 to form dots while causing the printer carriage 240 to be subjected to primary scanning by driving the carriage motor 230. By repeating such operations, dots of respective colors of C, M, Y and K are formed on the printing medium P at a proper distribution responsive to the grayscale values of the image data. As a result, the image is printed.

In the above-described image print processing, if necessary, the image data is adjusted through the face adjustment processing. Accordingly, it is possible to prevent the human face from giving a flat impression according to how light enters, and it is possible to print an image that always gives a favorable impression. Hereinafter, the details of the face adjustment processing to be performed in the above-described image print processing will be described.

Figure 12:
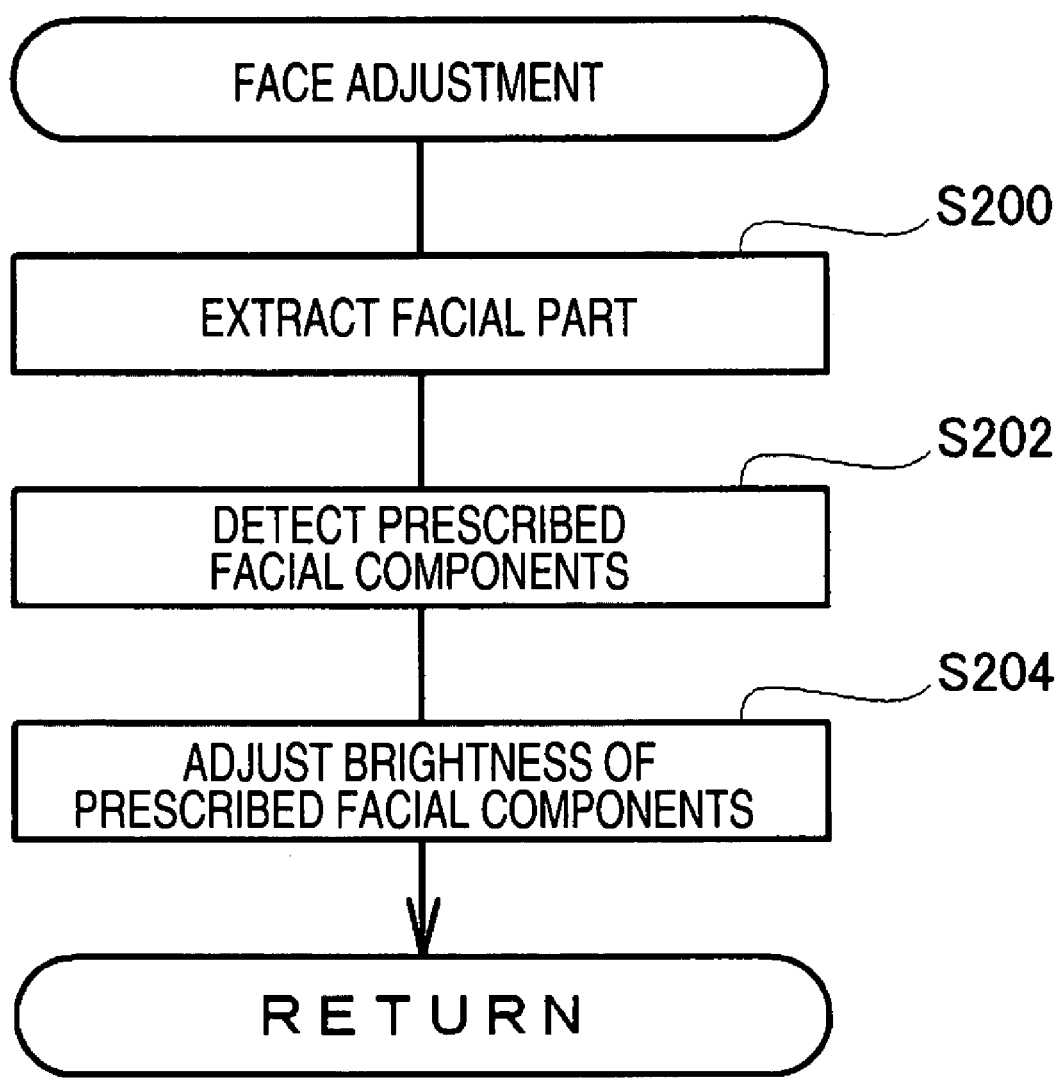
FIG. 12 is a flowchart showing a facial impression adjustment executed in the printing apparatus.

As shown in FIG. 12, in the facial impression adjustment, first, a processing for analyzing the image data and extracting the portion of the human face is performed (Step S200). As a method of extracting the portion of the face, various methods are suggested, but the portion of the face can be roughly extracted by the following method.

First, a contour of objects is extracted from the image data. In order to extract the contour, noise is removed using a two-dimensional filter, such as a median filter or the like, contrast or edge is highlighted, and binarization is performed. Then, a boundary of the obtained binarized image is extracted as the contour of the object. Next, a processing for excluding, from the extracted contour, a portion to be clearly considered that does not correspond to the human face is performed. For example, an object having a high proportion of a straight line in the extracted contour is likely to be an artifact, not the human face. In such a manner, an object to be clearly judged that it is not the human face is excluded, objects to be considered as "eyes", "mouth", and "nose" are extracted from the contour of the remaining objects.

If the objects are actually "eyes", "mouth", and "nose", they are supposed to a prescribed positional relationship. For example, when an object to be considered as "mouth" is extracted, if an object that can be judged as "eyes" or "nose" (or an object that can be clearly judged as "eyes" or "nose") exists upward, it can be judged that the extracted object is "mouth". Similarly, if an object to be considered as "eyes" is actually "eyes", in many cases, an object to be as "eyes" of the same sense may exist at a short distance. In such a manner, the objects to be considered as "eyes", "mouth", and "nose" are extracted from the contour, and then "eyes", "mouth", and "nose" can be specified in consideration with the positional relationship between the extracted objects. Finally, if the contour of the face including a set of "eyes", "mouth", and "nose" is extracted, the portion of the human face in the image can be extracted.

Figure 13:
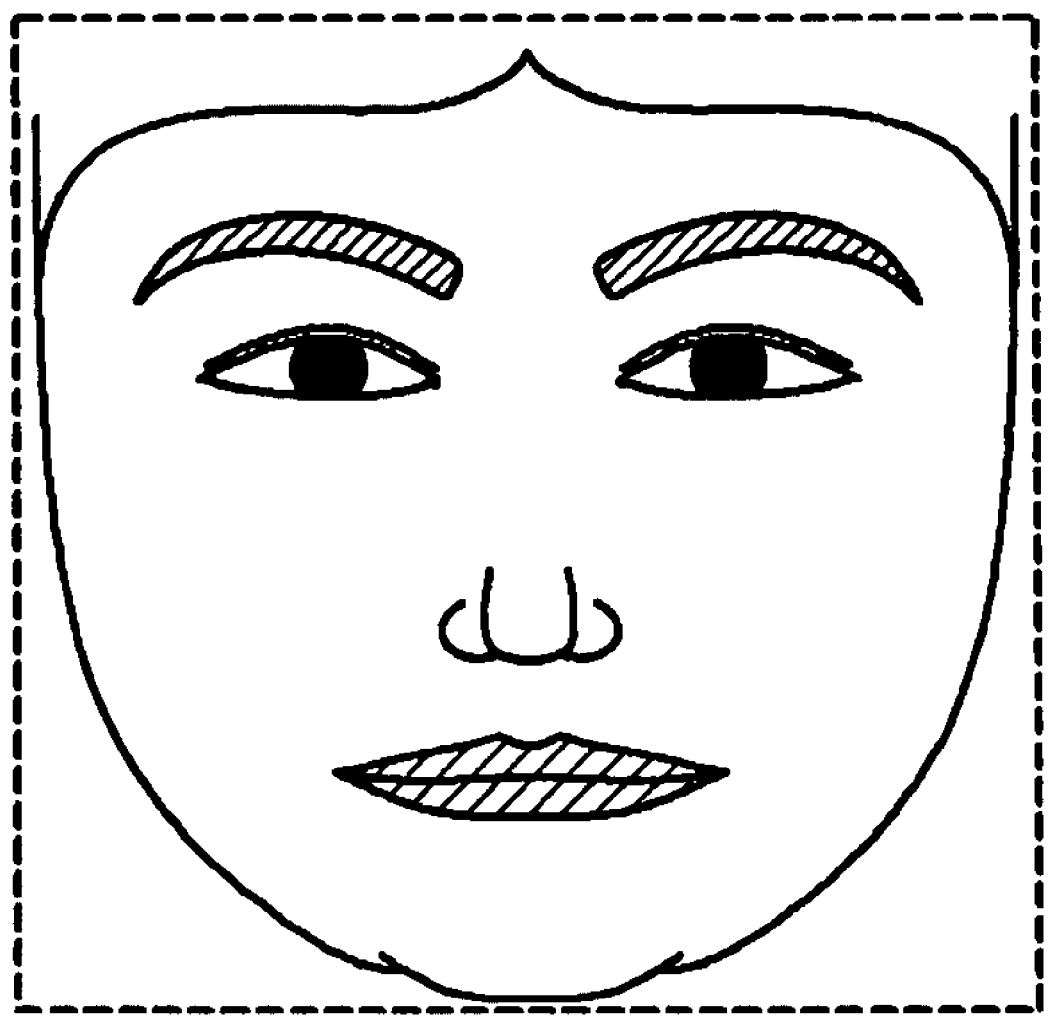
FIG. 13 is a schematic view showing a state that a portion of a human face extracted from an image.

FIG. 13 shows a case where the portion of the human face is extracted from the image in the above-described manner. A rectangular region indicated by a dashed line in FIG. 13 becomes a region of the human face. At Step S200 of FIG. 12, the processing for extracting the facial portion in the above-described manner is performed.

After the facial portion is extracted in the above-described manner, a processing of detecting prescribed parts in the face starts (Step S202). Here, as the prescribed parts, a nasalis muscle, a side of the nasalis muscle, and a cheek are detected. Of course, other portions (for example, cheekbone, forehead, and chin) of the face may be detected. These prescribed parts are detected as follows.

Figure 14:
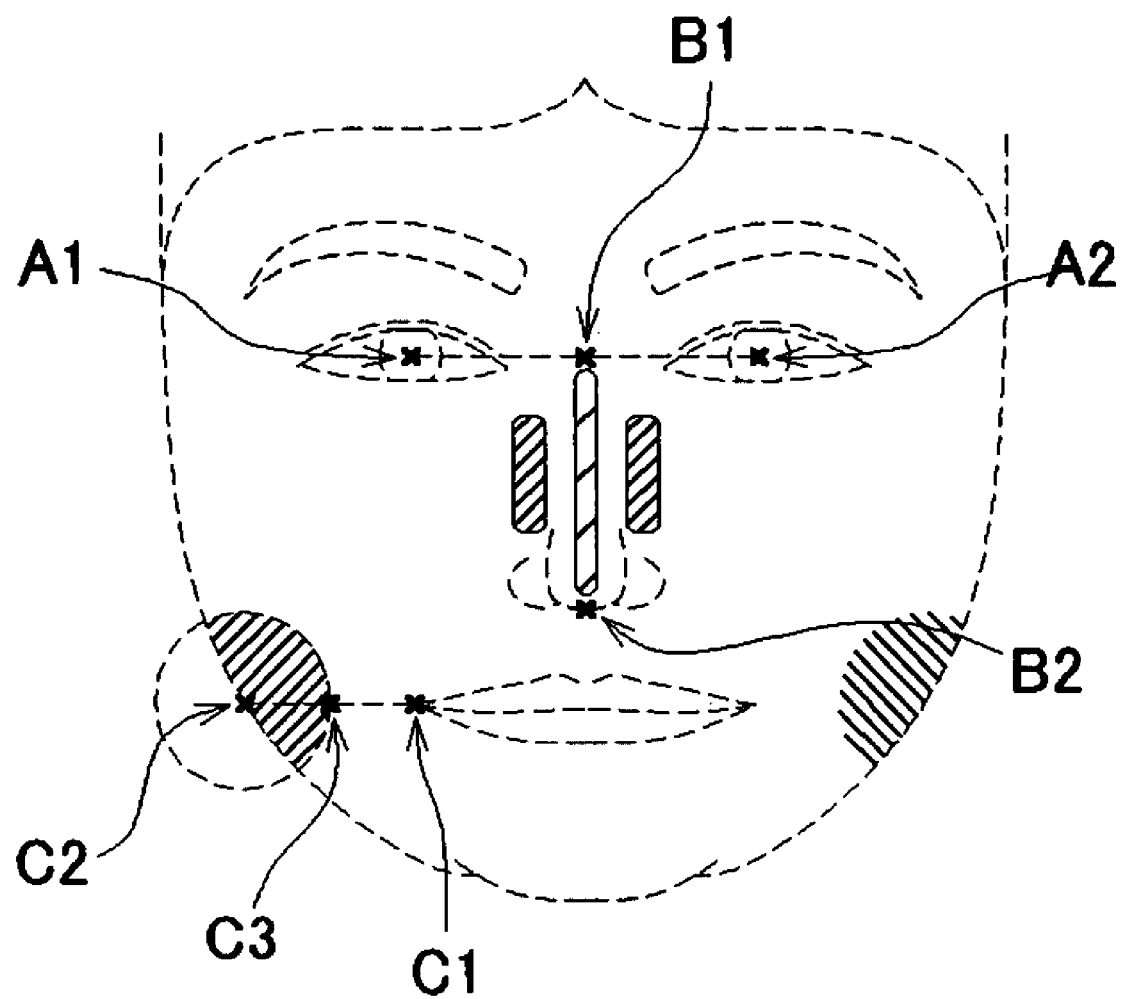
FIG. 14 is a schematic view showing a state that a prescribed part is detected from the extracted face.

FIG. 14 shows a case where prescribed parts are detected from the extracted face. First, as for the nasalis muscle, positions A1 and A2 of left and right eyes in the image are detected. Next, a center point B1 between the points A1 and A2 is detected, and this position is supposed to the base of the nose. Then, a position (a point B2 of FIG. 14) of a tip of the nose is detected downward from the position (a point B1 of FIG. 14) of the base of the nose. Unlike the eye or the mouth, the nose is merely a protrusion of the skin and has the same color as the periphery. Accordingly, it is difficult to accurately a nose, compared with the eye or the mouth. In this case, however, if the base of the nose is detected from the position of the eye, and a portion, in which brightness rapidly decreases, is searched downward from the position of the base of the nose, even though it is difficult to accurately grasp the shape of the nose, the tip of the nose can be relatively accurately detected. Then, if the detected base and tip of the nose are connected, the nasalis muscle can be detected.

Further, a position of a side of the nasalis muscle is detected using the position of the nasalis muscle detected in such a manner. That is, a small nose at the tip of the nose is detected, and then a portion lateral to the nasalis muscle is detected as the side of the nasalis muscle.

In addition, the cheek is detected as follows. First, the mouth is detected from the face, and points corresponding to both corners of the mouth are detected. FIG. 14 shows a case where a left mouth corner is detected as a point C1. Next, a virtual line horizontally extends from the point corresponding to the mouth corner on the image, and a point at which the virtual line crosses the contour of the face is detected. FIG. 14 shows a case where a virtual line extends leftward from the point C1 and a point C2 at which the virtual line crosses the contour of the face is detected. Then, a circle D having a center point C3 from the point C2 to the point C1 as a radius around the point C2 is assumed, and a portion of the face included in the circle D is detected as the cheek.

After the prescribed parts are detected from the face in such a manner (Step S202 of FIG. 12), a processing that adjusts brightness of the detected portions (in this case, the nasalis muscle, the side of the nasalis muscle, and the cheek) is performed (Step S204). First, for the nasalis muscle, the image data is adjusted such that brightness thereof slightly increases. Here, instead of correcting the entire portion from the point B1 to the point B2 to be detected as the nasalis muscle, a slightly short portion (having a slightly short length of 80 to 90%) may be adjusted with both ends left. In this case, the adjustment can be naturally performed. Further, the width of the nasalis muscle may be set to a fixed value. In this case, if the width of the nasalis muscle is set at a prescribed proportion with respect to the length, the nasalis muscle can be adjusted at an appropriate width, regardless of the size of a face in an image to be captured. Moreover, as for the adjustment that increases brightness of the nasalis muscle, it is preferable to gradually change brightness such that brightness does not rapidly change between a portion to be adjusted and its periphery.

As for the side of the nasalis muscle, the image data is adjusted such that brightness thereof slightly decreases. The length and width of a portion in which brightness decreases are set on the basis of the portion adjusted as the nasalis muscle. For example, the length is set to half of the length adjusted as the nasalis muscle is set and the width is set to 1.5 times as large as the width of the nasalis muscle. As for the cheek, the image data is also adjusted such that brightness slightly decreases. Further, when the side of the nasalis muscle and the cheek are adjusted, it is preferable to cause brightness to gradually change such that brightness does not rapidly change between the adjusted portion and its periphery.

After the processing that adjusts brightness of the prescribed parts detected from the face is performed in above-described manner, the face adjustment processing shown in FIG. 12 ends, and the process returns to the image print processing of FIG. 7. As described above, in the image print processing, the color conversion (Step S108 of FIG. 7), the halftoning (Step S110), the interlacing (Step S112), and the dot formation (Step S114) are performed on the image data subjected to the face adjustment. Then, the ink dots are formed on the printing medium, and the image is printed.

In the image printed using the printing apparatus 10 of this embodiment described above, printing is performed such that the nasalis muscle is made slightly bright as if light enters, and the side of the nasalis muscle or the cheek is made slightly dark as a dark side. For this reason, the face that is captured to give a flat impression due to the adjustment of light can be printed as a face having a stereoscopic favorable impression.

In the printing apparatus 10 of this embodiment described above, a face having a stereoscopic favorable impression can be printed only by supplying captured image data to the printing apparatus 10. That is, the face can be adjusted without being recognized by a user. Therefore, it looks like "good-looking photo". As a result, unlike an image in which a facial portion is adjusted using an exclusive-use application, the user can feel satisfaction.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application No. 2006-13610 filed Jan. 23, 2006 including specification, drawings and claims is incorporated herein by reference in its entirety.

What is claimed is:

1. A printing method, comprising:
receiving image data obtained by capturing an image including a human;
analyzing the image data and extracting a part of the image including a human face;
detecting a prescribed part of the extracted human face;
adjusting brightness of the image data with reference to the prescribed part to obtain adjusted image data; and
printing an image based on the adjusted image data,
wherein the prescribed part includes a nasalis muscle and a side of the nasalis muscle, and the detecting of the prescribed part includes:
detecting positions of left and right eyes in the extracted human face;
defining a center point between the positions of the left and right eyes as a base of a nose;
defining a point positioned downward from the center point and where the brightness is rapidly decreased, as a tip of the nose; and
detecting the nasalis muscle by connecting the base of the nose and the tip of the nose,
wherein the image data is so adjusted that the brightness of a part of the nasalis muscle is increased,
wherein the part of the nasalis muscle to be adjusted, has a first length shorter than a length between the base of the nose and the tip of the nose, excepts both ends of the nasalis muscle, and has a first width set at a proportion with respect to the length,
wherein the image data is so adjusted that the brightness of a part of the side of the nasalis muscle is decreased, and
wherein the part of the side of the nasalis muscle to be adjusted has a second length which is half of the first length and a second width which is 1.5 times the first width.

2. The printing method as set forth in claim 1, wherein:
the prescribed part includes at least one nostril; and
the image data is so adjusted that the brightness of an area aside the nasalis muscle and above the at least one nostril is decreased.

3. The printing method as set forth in claim 1, wherein:
the prescribed part includes at least one cheek; and
the image data is so adjusted that the brightness of the at least one cheek is decreased.

4. The printing method as set forth in claim 1, further comprising:
detecting whether the image data is associated with information indicative whether the image is captured with flashlight; and printing the image data without the adjusting in a case where the information indicates that the image is captured without flashlight.

5. The printing method as set forth in claim 1, wherein:
the prescribed part includes at least one nostril and at least one cheek;
the detecting of the prescribed part includes:
detecting first points corresponding to both corners of a mouth in the extracted human face;
detecting second points at which a virtual line horizontally extending from the first points crosses a contour of the extracted human face;
detecting a center point between one of the first points and the one of the second points on the virtual line; and
defining a portion included in a circle which a center thereof is one of the second points and a radius thereof is a length from one of the second points to one of the first points, as the at least one cheek;
the image data is so adjusted that the brightness of an area aside the nasalis muscle and above the at least one nostril is decreased; and
the image data is so adjusted that the brightness of the at least one cheek is decreased.

6. A printing apparatus, comprising:
a receiver, operable to receive image data obtained by capturing an image including a human;
an analyzer, operable to analyze the image data and to extract a part of the image including a human face;
a detector, operable to detect a prescribed part of the extracted human face;
an adjuster, operable to adjust brightness of the image data with reference to the prescribed part to obtain adjusted image data; and
a printing section, operable to print an image based on the adjusted image data,
wherein the prescribed part includes a nasalis muscle and a side of the nasalis muscle, and the detector is operable to:
detect positions of left and right eyes in the extracted human face;
define a center point between the positions of the left and right eyes as a base of a nose;
define a point positioned downward from the center point and where the brightness is rapidly decreased, as a tip of the nose; and
detect the nasalis muscle by connecting the base of the nose and the tip of the nose,
wherein the adjuster adjusts the image data so that the brightness of a part of the nasalis muscle is increased,
wherein the part of the nasalis muscle to be adjusted, has a first length shorter than a length between the base of the nose and the tip of the nose, excepts both ends of the nasalis muscle, and has a first width set at a proportion with respect to the length,
wherein the adjuster adjusts the image data so that the brightness of a part of the side of the nasalis muscle is decreased, and
wherein the part of the side of the nasalis muscle to be adjusted has a second length which is half of the first length and a second width which is 1.5 times the first width.

7. An image processing method, comprising:
receiving image data obtained by capturing an image including a human;
analyzing the image data and extracting a part of the image including a human face;
detecting a prescribed part of the extracted human face;
adjusting brightness of the image data with reference to the prescribed part to obtain adjusted image data; and
generating control data adapted to be used in a printing apparatus, based on the adjusted image data,
wherein the prescribed part includes a nasalis muscle and a side of the nasalis muscle, and the detecting of the prescribed part includes:
detecting positions of left and right eyes in the extracted human face;
defining a center point between the positions of the left and right eyes as a base of a nose;
defining a point positioned downward from the center point and where the brightness is rapidly decreased, as a tip of the nose; and
detecting the nasalis muscle by connecting the base of the nose and the tip of the nose,
wherein the image data is so adjusted that the brightness of a part of the nasalis muscle is increased,
wherein the part of the nasalis muscle to be adjusted, has a first length shorter than a length between the base of the nose and the tip of the nose, excepts both ends of the nasalis muscle, and has a first width set at a proportion with respect to the length,
wherein the image data is so adjusted that the brightness of a part of the side of the nasalis muscle is decreased, and
wherein the part of the side of the nasalis muscle to be adjusted has a second length which is half of the first length and a second width which is 1.5 times the first width.

8. An image processor, comprising:
a receiver, operable to receive image data obtained by capturing an image including a human;
an analyzer, operable to analyze the image data and to extract a part of the image including a human face;
a detector, operable to detect a prescribed part of the extracted human face;
an adjuster, operable to adjust brightness of the image data with reference to the prescribed part to obtain adjusted image data; and
a generator, operable to generate control data adapted to be used in a printing apparatus, based on the adjusted image data,
wherein the prescribed part includes a nasalis muscle and a side of the nasalis muscle, and the detector is operable to:
detect positions of left and right eyes in the extracted human face;
define a center point between the positions of the left and right eyes as a base of a nose;
define a point positioned downward from the center point and where the brightness is rapidly decreased, as a tip of the nose; and
detect the nasalis muscle by connecting the base of the nose and the tip of the nose,
wherein the adjuster adjusts the image data so that the brightness of a part of the nasalis muscle is increased,
wherein the part of the nasalis muscle to be adjusted, has a first length shorter than a length between the base of the nose and the tip of the nose, excepts both ends of the nasalis muscle, and has a first width set at a proportion with respect to the length,
wherein the adjuster adjusts the image data so that the brightness of a part of the side of the nasalis muscle is decreased, and
wherein the part of the side of the nasalis muscle to be adjusted has a second length which is half of the first length and a second width which is 1.5 times the first width.

* * * * *